Patented June 3, 1930

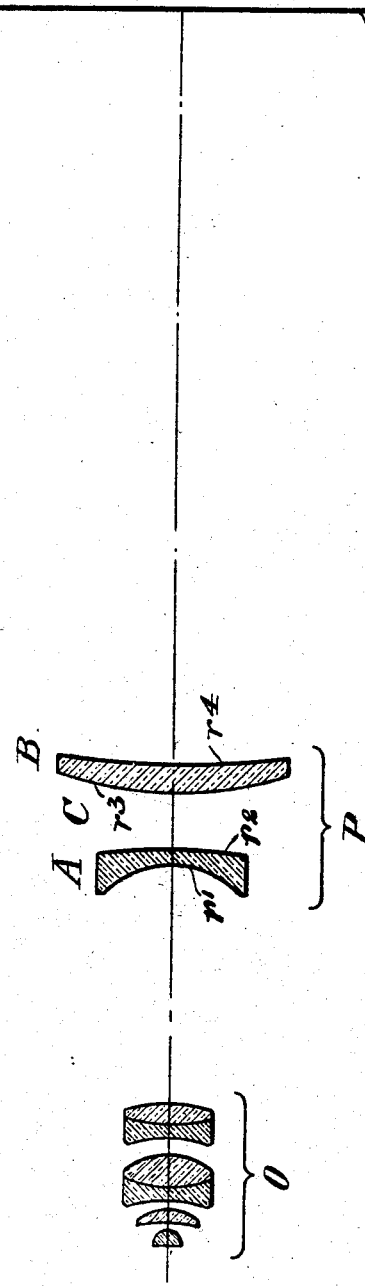

1,761,441

UNITED STATES PATENT OFFICE

LEON V. FOSTER, OF ROCHESTER, NEW YORK, ASSIGNOR TO BAUSCH & LOMB OPTICAL COMPANY, OF ROCHESTER, NEW YORK, A CORPORATION OF NEW YORK

LENS SYSTEM

Application filed April 13, 1925. Serial No. 22,638.

The present invention relates to a lens system, and has for its object to provide an improved combination of lens elements negative in power designed to form an element of a projecting lens system particularly adapted for photographic and projection purposes whereby to improve the results obtained with objective lens systems employed in work of this kind.

A further object of the invention is to provide an improved lens system embodying several lens elements which when taken together form a projecting lens system adapted for projecting images formed by microscope objectives on photographic plates or films, substantially free from curvature of field, the invention being particularly useful in the fields of photomicrography.

A still further object of the invention is to provide a simplified and relatively inexpensive corrective lens system, negative in power, adapted for use in combination with the objectives of different types of photographic apparatus adapted for image projection, whereby to improve upon the results produced in work of this kind.

To these and other ends the invention resides in certain improvements and combinations of parts, all as will be hereinafter more fully described, the novel features being pointed out in the claims at the end of the specification.

One embodiment of the present invention is illustrated diagrammatically in the accompanying drawing, shown in axial section and including an objective lens system indicated generally at O together with my improved corrective lens system, the latter being indicated generally at P.

In photomicrography as well as in lantern slide projection it is particularly important to have the projected images appear on the photographic film or plate, or upon the screen, free from curvature of field, distortion, astigmatism and chromatic difference of magnification. The present invention is adapted to overcome these defects without adding materially to the cost of apparatus of this class.

The present corrective lens system embodies two lenses, one a negative crown lens indicated at A, and the other a positive flint lens, as shown at B, with an air space C between them. The function of the negative lens A is to introduce negative curvature into the image it forms of the curved image formed by the objective O sufficient to neutralize or compensate for the positive curvature of said objective and that introduced by the positive lens B, whereby to produce upon the photographic plate or screen D an image substantially free from curvature of field. By negative curvature I mean that marginal points in the image lie further from the objective lens than central points therein and by positive curvature, that the marginal points lie nearer the objective lens than do the central points of the image. The extent of negative curvature introduced into the system depends upon the power of the negative lens; the stronger the negative lens the more negative curvature is introduced. The improved lens system is particularly useful in flattening the curved field of a high power microscope objective which produces more curvature of field than a low power objective.

The radii of curvature of the opposite faces of the A and B lens elements, reading from left to right, are $r_1$, $r_2$ and $r_3$, $r_4$, respectively. The index of refraction and reciprocal of dispersion for the A and B lens elements, respectively, are $n_D'$, $V'$, $n_D''$, $V''$.

In the following table numerical values of the thickness of the lenses and the air space, radii of curvature of the surfaces, index of refraction and reciprocal of dispersion are given for four projecting lens systems of the kind described above which are corrected for curvature of field, distortion, astigmatism, and chromatic difference of magnification existing in the 16 mm., 8 mm., 4 mm., and 1.9 mm. achromatic objectives of the usual type.

| Obj. | $d_1$ | $d_2$ | $d_3$ | $r_1$ | $r_2$ | $r_3$ | $r_4$ | $n_D'$ | $V'$ | $n_D''$ | $V''$ |
|---|---|---|---|---|---|---|---|---|---|---|---|
| 16 mm | 2.4 | 6.0 | 3.7 | 20.15 | 38.67 | 44.81 | 198.1 | 1.609 | 58.7 | 1.674 | 32.1 |
| 8 mm | 2.0 | 5.0 | 4.0 | 12.61 | 00 | 37.00 | 57.0 | 1.513 | 60.6 | 1.720 | 29.3 |
| 4 mm | 1.6 | 8.3 | 4.0 | 8.50 | 44.50 | 68.91 | 71.0 | 1.614 | 54.5 | 1.674 | 32.1 |
| 1.9 mm | 1.6 | 6.5 | 3.3 | 8.80 | 103.5 | 37.5 | 116.3 | 1.463 | 66.1 | 1.720 | 29.3 |

It will be noted that the negative lens A is located nearest the objective O and that both lenses have their shorter radii or surfaces of greater curvature facing said objective. The negative lens A, which has an anterior focus, will produce a virtual image of the one projected by the objective O and this virtual image, which has positive curvature with respect to the lens B, will be converted by the positive lens B into a real and magnified image projected upon the photographic plate or screen D free from curvature of field.

My improved lens system contains enough variables to correct for the well known aberrations of lenses, such as distortion, astigmatism due to oblique pencils and by choice of glass, chromatic difference of magnification as well.

The slide or object holder, the light source and the condenser for the objective and other parts of the projection apparatus are not shown, but may be of any approved type well known in the art.

It will be understood that the present lens system can be constructed to have different focal lengths to afford different magnifications, a focal length, for example, of 33.0 mm. affording a projected field area having substantially a tenfold magnification over that projected with a 7.5× eye piece for the same position of the photographic plate with respect to the microscope objective.

The present invention therefore affords a simple lens combination embodying two elements, one negative and the other positive, the former facing the microscope objective and adapted to introduce negative curvature of the image sufficient to neutralize or compensate for the positive curvature of the objective and that introduced by the positive lens of the system. In this way a virtual image having positive curvature with respect to the B lens is converted by the latter into a plane or real image substantially free from curvature of field when projected upon the photographic plate or screen D.

It will be understood that the accompanying drawing is merely diagrammatic in form and that objectives of different sizes having different focal lengths may be employed and properly adjusted with respect to the present type of projecting lens system, and further, that various modifications of the invention may be made within the scope of the claims without departing from the spirit of the invention.

I claim as my invention:

1. In a projecting system, lens means negative in power to be used with a microscope objective for projecting the image formed by it on a photographic film or plate in a camera, comprising two elements, one negative in power and one positive in power, the negative element facing the microscope objective and both having their surfaces of greater curvature facing said objective.

2. The combination with a microscope objective of a corrective lens system adapted to receive light rays from said objective, said system comprising two elements each having a concave and a convex surface, the convex surfaces of said elements facing each other, one of said elements being negative in power and the other element being positive in power, said first named element facing the objective.

LEON V. FOSTER.